US010732292B2

(12) United States Patent
Eagling

(10) Patent No.: US 10,732,292 B2
(45) Date of Patent: Aug. 4, 2020

(54) METHOD AND SYSTEM FOR DEALING WITH ANTENNA BLOCKAGE IN A LOW EARTH ORBIT CONSTELLATION

(71) Applicant: Trevor Eagling, Frederick, MD (US)

(72) Inventor: Trevor Eagling, Frederick, MD (US)

(73) Assignee: Hughes Network Systems, Germantown, MD (US)

( * ) Notice: Subject to any disclaimer, the term of this patent is extended or adjusted under 35 U.S.C. 154(b) by 0 days.

(21) Appl. No.: 16/563,468

(22) Filed: Sep. 6, 2019

(65) Prior Publication Data

US 2019/0391273 A1  Dec. 26, 2019

Related U.S. Application Data

(62) Division of application No. 15/280,391, filed on Sep. 29, 2016, now Pat. No. 10,444,373.

(51) Int. Cl.
*G01S 19/28* (2010.01)
*G01S 19/05* (2010.01)
(Continued)

(52) U.S. Cl.
CPC .............. *G01S 19/28* (2013.01); *G01S 19/05* (2013.01); *H04B 7/18513* (2013.01);
(Continued)

(58) Field of Classification Search
CPC .......... G01S 19/05; G01S 19/13; G01S 19/26; G01S 19/08; G01S 19/20; G01S 19/25;
(Continued)

(56) References Cited

U.S. PATENT DOCUMENTS

| 5,946,603 A | 8/1999 | Ibanez-Meier et al. |
| 6,070,051 A | 5/2000 | Astrom et al. |

(Continued)

FOREIGN PATENT DOCUMENTS

| WO | 9957824 A2 | 11/1999 |
| WO | 0117133 A1 | 3/2001 |

OTHER PUBLICATIONS

Communication relating to the results of the partial international search in corresponding PCT application PCT/US2017/053387.

*Primary Examiner* — Olumide Ajibade Akonai
(74) *Attorney, Agent, or Firm* — Capitol City TechLaw; Jasbir Singh

(57) ABSTRACT

A system and method for providing communications with a Low Earth Orbit (LEO) satellite constellation using a non-omnidirectional antenna is disclosed. A system and method for determining blockages around a non-omnidirectional antenna for use with a Low Earth Orbit (LEO) constellation is disclosed. The method including: receiving System Information (SI) including ephemeris data for satellites in the LEO constellation; receiving a segment division that divides a ground about the antenna into segments; and determining a segment blocking information for the antenna. The determining is performed by, for each of the satellites, calculating a current direction from the antenna to the respective satellite based on the respective satellite's ephemeris data, mapping the current direction into one of the segments, aiming the antenna in the current direction, attempting a signal lock with the satellite, and setting the segment blocking information indicating the mapped segment as blocked, when the signal lock is unsuccessful.

7 Claims, 4 Drawing Sheets

(51) Int. Cl.
*H04B 7/185* (2006.01)
*G01S 19/20* (2010.01)
*G01S 19/25* (2010.01)
*G01S 19/08* (2010.01)

(52) U.S. Cl.
CPC ............... *G01S 19/08* (2013.01); *G01S 19/20* (2013.01); *G01S 19/258* (2013.01)

(58) Field of Classification Search
CPC ........ G01S 19/28; G01S 19/258; G01S 19/14; H04B 7/18513; H04B 7/18578
See application file for complete search history.

(56) References Cited

U.S. PATENT DOCUMENTS

| | | | |
|---|---|---|---|
| 6,169,881 B1 | 1/2001 | Astrom et al. | |
| 6,272,316 B1 | 8/2001 | Wiedeman et al. | |
| RE37,408 E * | 10/2001 | Loomis | G01S 19/06 342/357.75 |
| 6,459,407 B1 * | 10/2002 | Akopian | G01S 19/24 342/357.25 |
| 7,113,128 B1 | 9/2006 | Pitt et al. | |
| 9,766,339 B2 | 9/2017 | Robinson et al. | |
| 10,444,373 B2 * | 10/2019 | Eagling | G01S 19/05 |
| 2012/0209519 A1 | 8/2012 | Basnayake | |
| 2012/0300815 A1 | 11/2012 | Tronc | |
| 2014/0070991 A1 | 3/2014 | Liu et al. | |

\* cited by examiner

METHOD AND SYSTEM FOR DEALING WITH ANTENNA BLOCKAGE IN A LOW EARTH ORBIT CONSTELLATION

CROSS-REFERENCE TO RELATED APPLICATIONS AND INCORPORATION BY REFERENCE

The present application is a divisional of U.S. application Ser. No. 15/280,391, filed Sep. 29, 2016, which is incorporated herein by reference in its entirety.

FIELD

The present teachings disclose methods and systems to deal with local line-of-sight blockage for a satellite terminal operating using a Low Earth Orbit (LEO) satellite constellation. In some embodiments, a terminal's deployed location is scanned to develop a blockage map. In some embodiments, the blockage map is developed by the terminal, in particular, at least at a terminal deployment. In some embodiments, the blockage map maybe communicated to a satellite gateway and subsequently used for satellite selection and traffic routing between the gateway and the terminal.

BACKGROUND

The present teachings enable communication operations between a terminal and a LEO constellation in presence of line-of-sight blockage for part of the sky, so long as satellites are available in other unblocked parts.

Prior art communication systems based on a Low Earth Orbit (LEO) LEO constellation that used only one unidirectional antenna, mounted the antenna high enough that there was no blockage between a terminal and an ephemeris of a satellite in the LEO constellation. Other alternatives required more antennas and less efficient use of satellite bandwidth.

Prior art communication systems also precluded usage of K-Band (Ka-band or Ku-band) for LEO constellations. Traditionally, Ku-band and Ka-band have been used for Fixed Satellite Systems (FSS) using geosynchronous (GEO) satellites. This enables selection of an antenna site with a clear view of the GEO satellite, generally, southerly in the Northern hemisphere. As the GEO satellite appears to be in a fixed location at installation, an antenna is installed such that blockages, such as, buildings, trees or the like, are not in a line of site of the GEO satellite and thus the blockages are of no consequence. Other prior art LEO systems (and MOBILESAT GEO systems), such as IRIDIUM, GLOBALSTAR, THURAYA and others have been designed with L-Band and S-Band user links, that are usable with Omnidirectional antennas. For the terminals to look for channels, they only need to look for frequencies and blockage geometry is not an issue. In such systems, there are several satellites in the field of view of the omnidirectional antenna. Even though a path to a satellite in the constellation is blocked, paths to other satellites that are differentiated by frequency in the constellation are available. As such, the terminal can determine which satellites in the constellation are available without any antenna motion. Other prior art systems, such as, GLOBALSTAR, even allow for diversity, where multiple satellite paths are used for communication simultaneously.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

An exemplary method for determining blockages around a non-omnidirectional antenna for use with a Low Earth Orbit (LEO) constellation is disclosed. The method includes: receiving System Information (SI) including ephemeris data for satellites in the LEO constellation; receiving a segment division that divides a ground about the antenna into segments; and determining a segment blocking information for the antenna by, for each of the satellites, calculating a current direction from the antenna to the respective satellite based on the respective satellite's ephemeris data, mapping the current direction into one of the segments, aiming the antenna in the current direction, attempting a signal lock with the satellite, and setting the segment blocking information indicating the mapped segment as blocked, when the signal lock is unsuccessful.

An exemplary terminal to determine blockages around a non-omnidirectional antenna for use with a Low Earth Orbit (LEO) constellation is disclosed. The terminal includes: an antenna controller; a non-omnidirectional antenna capable of being aimed in a desired direction by the antenna controller; a transceiver connected to the non-omnidirectional antenna; a System Information (SI) manager to provide ephemeris data for satellites in the LEO constellation, and a segment division that divides a ground about the non-omnidirectional antenna into segments; and a segment blockage trainer to determine a segment blocking information for the non-omnidirectional antenna. The segment blockage trainer operates by, for each of the satellites, calculating a current direction from the non-omnidirectional antenna to the respective satellite based on the respective satellite's ephemeris data, mapping the current direction into one of the segments, aiming the non-omnidirectional antenna with the antenna controller in the current direction, attempting a signal lock with the satellite, and setting the segment blocking information indicating the mapped segment as blocked, when the signal lock is unsuccessful.

An exemplary method for providing communications with a Low Earth Orbit (LEO) satellite constellation using a non-omnidirectional antenna is disclosed. The method includes: receiving ephemeris data for satellites in the LEO constellation; receiving a segment division that divides a ground cell into segments; calculating, for the satellite, a path availability and a satellite direction from the ground cell; defining a logical cell for each of the segments, wherein each logical cell overlays the ground cell and each logical cell is associated with a general direction for the respective segment; selecting the logical cell from the logical cells associated with the ground cell and the satellite direction; and associating the path availability of the satellite with the selected logical cell.

An exemplary system to provide communications with a Low Earth Orbit (LEO) satellite constellation is disclosed. The system includes: a System Information (SI) manager to provide ephemeris data for satellites in the LEO constellation, and a segment division that divides a ground cell into segments; and a satellite locator to calculate, for the satellite, a path availability and a satellite direction from the ground cell; and a logical cell manger. The logical cell manager is adapted to assign a logical cell for each of the segments, wherein each logical cell overlays the ground cell and each logical cell is associated with a general direction for the respective segment, to select the logical cell from the logical cells associated with the ground cell and the satellite direction, and to associate the path availability of the satellite with the selected logical cell.

Additional features will be set forth in the description that follows, and in part will be apparent from the description, or may be learned by practice of what is described.

DRAWINGS

In order to describe the manner in which the above-recited and other advantages and features may be obtained, a more particular description is provided below and will be rendered by reference to specific embodiments thereof which are illustrated in the appended drawings. Understanding that these drawings depict only typical embodiments and are not therefore to be considered to be limiting of its scope, implementations will be described and explained with additional specificity and detail through the use of the accompanying drawings.

Figure 1:
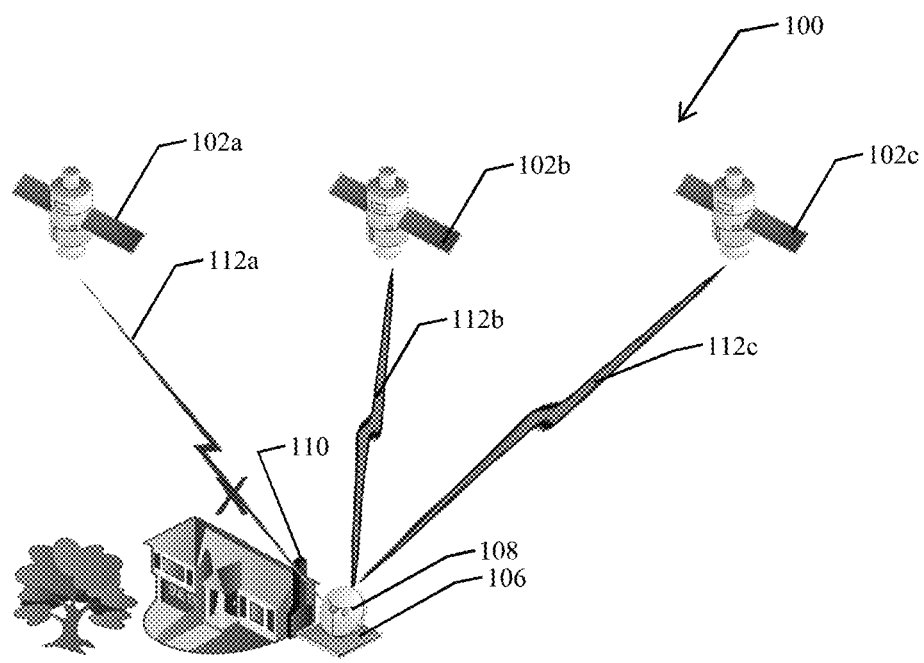
FIG. 1 illustrates a Low Earth Orbit (LEO) communication system including blockages, according to some embodiments.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

Embodiments are discussed in detail below. While specific implementations are discussed, it should be understood that this is done for illustration purposes only. A person skilled in the relevant art will recognize that other components and configurations may be used without parting from the spirit and scope of the subject matter of this disclosure.

The terminology used herein is for describing particular embodiments only and is not intended to be limiting of the present disclosure. As used herein, the singular forms "a," "an" and "the" are intended to include the plural forms as well, unless the context clearly indicates otherwise. Furthermore, the use of the terms a, an, etc. does not denote a limitation of quantity, but rather denotes the presence of at least one of the referenced item. The use of the terms "first," "second," and the like does not imply any particular order, but they are included to either identify individual elements or to distinguish one element from another. It will be further understood that the terms "comprises" and/or "comprising", or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. Although some features may be described with respect to individual exemplary embodiments, aspects need not be limited thereto such that features from one or more exemplary embodiments may be combinable with other features from one or more exemplary embodiments.

FIG. 1 illustrates a LEO communication system including blockages, according to some embodiments.

In a LEO communication system 100, a LEO constellation may include satellites 102a, 102b, 102c. The satellites 102a, 102b, 102c are in motion, relative to a terminal 108, and yet an antenna 108 needs to be pointed at one of the LEO satellites 102a, 102b, 102c in order to close a link between the terminal 108 and a satellite gateway (not shown). A single antenna 108 may only be pointed at one of the satellites 102a, 102b, 102c at any one time by a terminal 106. When the antenna 108 attempts to point to one of the satellites 102a, 102b, 102c along a path that does not have a clear line-of-sight at a satellite of the LEO constellation then communication between that satellite of the LEO constellation and the antenna 108 via is not feasible, for example, link 112a is impeded by a blockage 110 on a between satellite 102a and antenna 108. Even though the terminal 106 theoretically has a path to the satellite 102a, the path is blocked by the building or blockage 110. The satellite 102a may have been selected or chosen by a technician, a subscriber, the terminal 106, or a satellite gateway (not shown).

In exemplary embodiments, the LEO constellation may have two other satellites 102b, 102c over the horizon in the sky above antenna 108 that are visible, but because the antenna 108 is directional (albeit with a mechanical steering mechanism), the other satellites 102b, 102c are not visible to the terminal 106 unless the antenna 108 is aimed at them. Thus, to communicate, the terminal 106 and a gateway may use a link 112 b or 112c of the LEO communications system 100. As such, the terminal 106 needs to aim the antenna 108 to either satellite 102b or 102c. Selecting between satellites 102b or 102c may be performed by a technician, a subscriber, the terminal 106, or a satellite gateway (not shown). In exemplary embodiments, the selection may be made by the gateway and communicated to the terminal 106. The selection may be made based on one or more of a satellite capacity, shortest path between the gateway and the terminal 106, or the like.

The issue of failed communications maybe exacerbated for downlink traffic, i.e., traffic to the terminal from the gateway, and the allocation of timeslots for uplink traffic, i.e., traffic from the terminal 106 to the gateway. As such, the present teachings disclose a method and a system for a terminal and a gateway to allow for the blockage conditions at each terminal location and schedule communication paths accordingly, for example, via different satellites in the LEO constellation of the LEO communication system 100 for a given time.

In some embodiments, the gateway or centralized controller schedules by at least determining and assigning, ahead of time, which of the satellite 102a, 102b, 102c the terminal 106 uses at any particular time to communicate with the gateway.

In some embodiments, the terminal 106 may schedule, possibly with less granularity, which of the satellite 102a, 102b, 102c the terminal 106 uses at any particular time to communicate with the gateway. In some embodiments, the gateway may provide to the terminal 106 a schedule of which of the satellite 102a, 102b, 102c the terminal 106 uses at any particular time to communicate.

In some embodiments, the schedule allows for a non-communication window between the terminal 106 and the gateway, for example, when the antenna 110 is being repositioned from one satellite in the LEO system 100 to another satellite, or when none of the LEO satellites 102a, 102b, 102c have a communication path without intervening blockages to the terminal 106. In some embodiments, the schedule may include a movement vector or the like for the motorized antenna 110 to track a selected one of the LEO satellites 102a, 102b, 102c while communications are scheduled for being relayed thru the selected LEO satellite.

In some embodiment, a blockage may be determined via a method similar to ranging. Information for a blockage may identify a segment of a sky map that has a blockage as viewed from the antenna. In some embodiments, information for a blockage may include an inclination angle at which the blockage fails to block the sky from the antenna. The inclination angle maybe a degree to which something like a blockage rises up from a position level with the horizon as viewed from the position at which an antenna will be disposed for a terminal.

Figure 2:
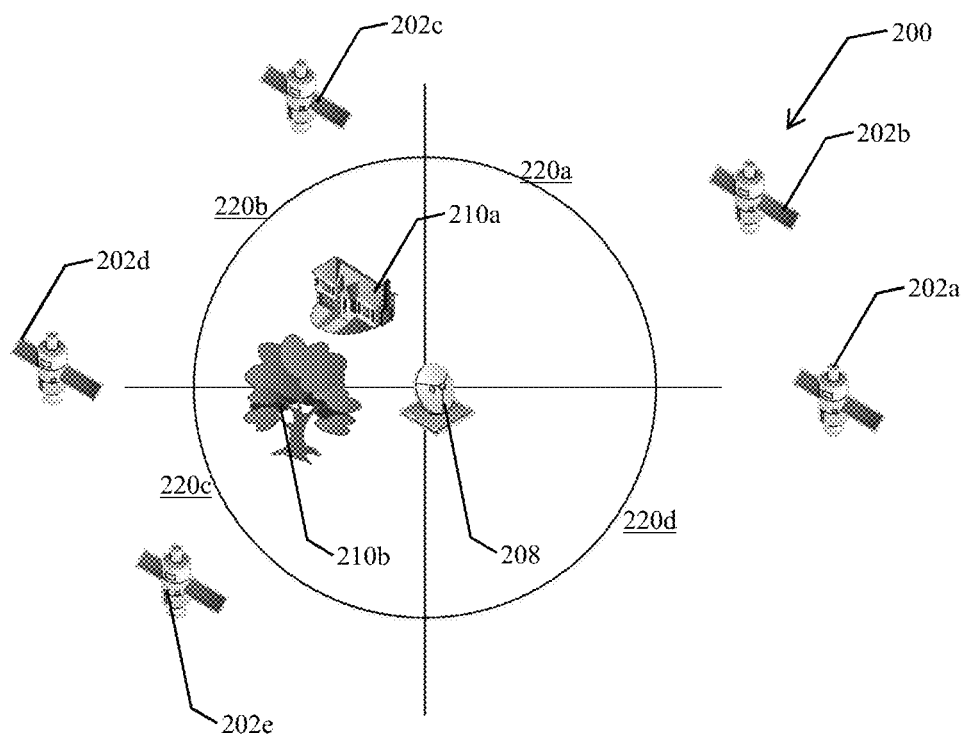
FIG. 2 illustrates a sky map for a LEO communication system including blockages, according to some embodiments.

FIG. 2 illustrates a sky map for a LEO communication system including blockages, according to some embodiments.

A sky map 200 for a LEO communication system may include objects of interest 210a, 210b. The LEO communications system includes satellites including satellites 202a, 202b, 202c, 202d, 202e visible in the sky map 200. The LEO communications system may includes satellites other than satellites 202a, 202b, 202c, 202d, 202e that are visible in the sky map 200 or provided for in ephemeris data known to the terminal. In some embodiments, the sky around an antenna 208 is divided into a predefined set of segments 220a-220d oriented in a fixed way, for example, northeast sky, northwest sky, southwest sky, southeast sky. In some embodiments, the segments 220a-220d maybe halves, eighths or any other division of the planar sky into segments. The segments 220a-220d may not be uniform in size. In some embodiments, the segments 220a-220d are of equal size. In the example of FIG. 2, a quadrant is used to flatten the sky into a plane and then the planar sky is divided into four segments 220a-220d to generate the sky map 200. In exemplary embodiments, the sky map 200 includes only the sky visible or above the horizon for a particular inclination angle. In exemplary embodiments, the inclination angle maybe more than, for example, 10, 15, 20, 30, 45, or the like, degrees above a rise of an object of interest 210a, 210b from a horizontal plane of a height of a unidirectional antenna 208. In exemplary embodiments, the sky map 200 includes objects of interest 210a, 210b from an eye-view of where and what height the antenna 208 for a terminal (not shown) is disposed. The sky map 200 may be a logical construct of the terminal 208, a gateway (not shown), or a person.

In exemplary embodiments, the sky map 200 includes objects of interest 210a, 210b to the visible sky per the eye-view from the antenna. In exemplary embodiments, the sky map 200 includes satellites in the LEO constellation as determined by their ephemeris data. In exemplary embodiments, the sky map 200 maybe modeled as a two dimensional coordinate system with the antenna 208 disposed at an origin (0,0) of the X and Y axes. Accuracy of the sky map 200 maybe in proportion to the number of segments 220a-220d used for the sky map 200. As such, accuracy of sky map 200 may be increased by using more segments. However, use of more segments may impose a system resource cost that can limit system capacity and may not always be desirable. In exemplary embodiments, the objects of interest 210a, 210b may be blockages.

Figure 3:
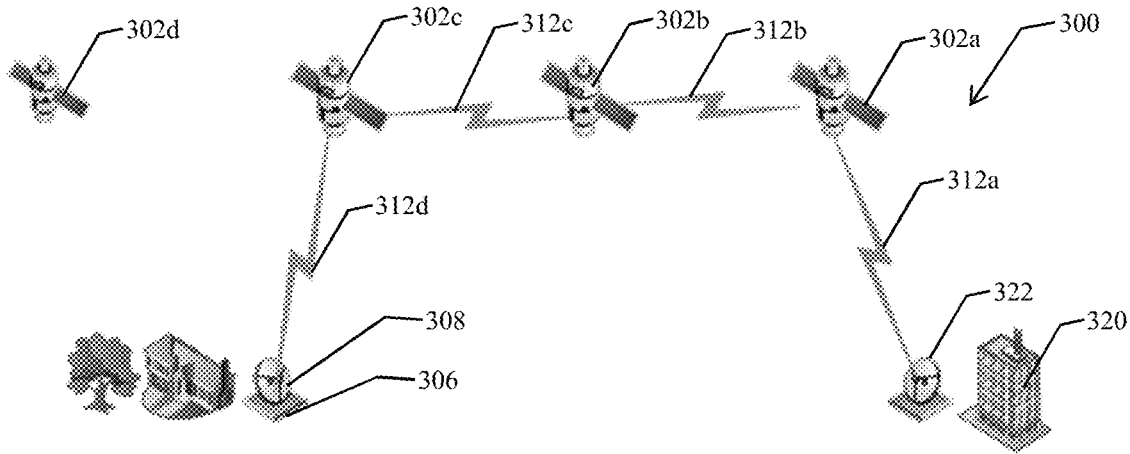
FIG. 3 illustrates a communications path for a LEO communication system, according to some embodiments.

FIG. 3 illustrates a communications path for a LEO communication system, according to some embodiments.

In exemplary embodiments, a LEO communications system 300 may provide communications between a gateway 320 and a terminal 306 via a LEO constellation. The LEO constellation may include satellites 302a, 302b, 302c, 302d that are in motion relative to a location of the gateway 320 and the terminal 306. The gateway 320 may use an antenna 322 to communicate with a satellite in the LEO constellation to which it has an unobstructed path, for example, satellite 302a in FIG. 3. The terminal 306 may use an antenna 308 to communicate with a satellite in the LEO constellation to which it has an unobstructed path, for example, satellite 302c in FIG. 3. The gateway 320 may act as a central authority that determines and controls which satellite of the LEO constellation may communicate with the terminal 306 for a time period, for example, satellite 302c in FIG. 3. The gateway 320 may act as a central authority that determines and controls which satellites (satellite 302b in FIG. 3) of the LEO constellation may be utilized for relaying a signal from the satellite (satellite 302a in FIG. 3) that antenna 322 is communicating with to the satellite (satellite 302c in FIG. 3) that antenna 308 is communicating with. Links 312a, 312b, 312c, 312d may be used to provide a communications path between the terminal 306 and the gateway 320.

Terminal Segment Blockage Determination:

In some embodiments, a LEO communication system may provide for a technician to map blockages or segment visibility for a terminal, and provide the segment visibility data to the gateway. In some embodiments, a LEO communication system may include a training sequence for a terminal to determine its blockages or segment visibility, and provide the segment visibility data to the gateway.

System information (SI) in all satellites may include terminal provisioning data and ephemeris data on all satellites for a time period including current time, for example, within the next few minutes, within the next fifteen minutes, within the next thirty minutes, or like. In some embodiments, the ephemeris data may be limited by geography, for example, by limiting the ephemeris data to ground cells corresponding to ground cells able to presently communicate with the satellite.

In some embodiments, ephemeris data may include a set of parameters to calculate a location of a satellite in the LEO constellation at a particular point in time. Ephemeris data describes the path that each satellite in the constellation is following as it orbits a planet or moon, such as, Earth. In some embodiments, ephemeris data may only be usable for a limited time (a few hours or less). Up-to-date data may be needed to minimize errors from minor variations in a satellite's orbit. In some embodiments, ephemeris data may be included in the signals that satellites in the LEO constellation transmit to a terminal.

In exemplary embodiments, Status Information (SI) for the LEO constellation maybe sent on a broadcast channel by all satellites in the LEO constellation. In some embodiments, the SI may act as a beacon. The terminal scans the sky looking for any satellite in the LEO constellation. When the terminal locates one, the terminal reads the ephemeris data. Based on the ephemeris, the terminal scans for other satellites that the terminal should be able to see and attempts to lock into the SI broadcasts. This is repeated over some time (maybe an hour) or a desired number of times, and the terminal builds a picture of where it can and cannot see satellites.

Figure 4:
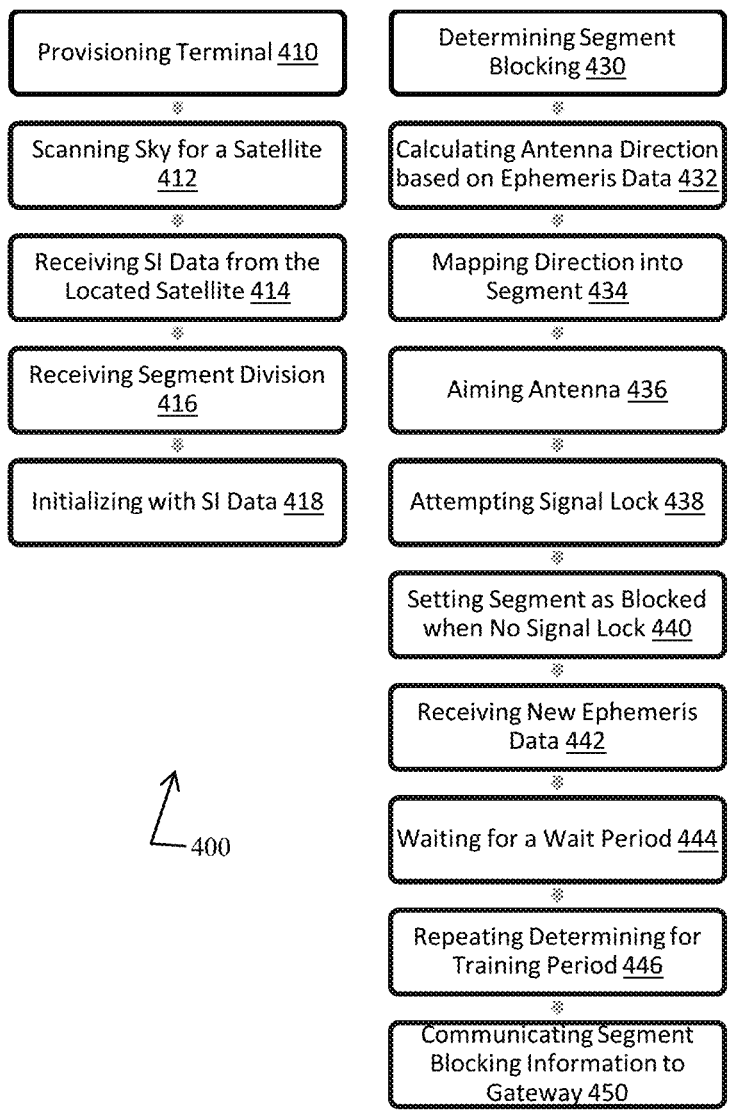
FIG. 4 illustrates a flowchart of an exemplary method for determining blockages around a non-omnidirectional antenna for use with a Low Earth Orbit (LEO) constellation, according to some embodiments.

FIG. 4 illustrates a flowchart of an exemplary method for determining blockages around a non-omnidirectional antenna for use with a Low Earth Orbit (LEO) constellation, according to some embodiments.

A method 400 for determining blockages around a non-omnidirectional antenna for use with a Low Earth Orbit (LEO) constellation including satellites is disclosed. The method 400 may include an operation for provisioning a terminal 410. Operation 410 may request a training of the antenna to generate a definition of blockages about the antenna. The method 400 may include an operation for scanning the sky for a satellite 412 in the LEO constellation. When a satellite is located by operation 412, the method 500 may use an operation for receiving SI data from the located satellite 414. The method 400 may include an operation for receiving segment division 416 information from the SI. The method 400 may include an operation for initializing data structures of the terminal with SI data 418.

The method 400 may include an operation for determining segment blocking information 430 about the antenna for each of the satellites included in the ephemeris data. The method 400 may include an operation for calculating an antenna direction based on ephemeris data 432. The method 400 may include an operation for mapping the antenna direction into a segment 434. The method 400 may include an operation for aiming the antenna 436 in the antenna direction. The method 400 may include an operation for attempting a signal lock 438 with the satellite aimed at. The method 400 may include an operation for setting the segment associated with antenna direction as blocked when no signal lock 440 is obtained. The method 400 may include an operation for receiving new ephemeris data 442. The method 400 may include an operation for waiting for a wait period 444. The method 400 may include an operation for repeating operation 446 for determining the blockages for each satellite in the ephemeris data by repeating operations 432, 434, 436, 438 and 440. The method 400 may include an operation for communicating the segment blocking information to a gateway 450.

Use of Segment Blockage Information to Communicate with Terminal

In exemplary embodiments, for example, at a registration point, the segment blockage information of the terminal may be sent to a centralized controller or gateway. The centralized controller maintains and stores the segment blockage information for each terminal in a data store. The segment blockage information is used to make path assignments to the terminal.

In exemplary embodiments, the segment blockage information maybe used in locating the terminal within ground based cells. Generally, each ground cell defines a physical location or area on the ground. In the present teachings, the system may define multiple logical cells. In exemplary embodiments, multiple logical cells may be associated with a ground cell. In exemplary embodiments, multiple logical cells may overlay a ground area of the ground cell. In exemplary embodiments, each logical cell would define a geographical boundary and an angle of communications for the cell. For example, if a cell is designed to cover roughly the state of Delaware and there are two segments, then the logical cells might be 'Delaware from the South' and 'Delaware from the North'. In another example, a cell may cover a hexagonal area. In exemplary embodiments, four equal segments may be used and angles of communications for each segment may respectively span from 0 to 90 degrees (cell from northeast), 90 to 180 degrees (cell from northwest), 180 to 270 degrees (cell from southwest), and 270 degrees to 360 degrees (cell from northwest) about the antenna on a compass. In exemplary embodiments, different number of segments may provide different wedge-shaped areas spanning various degrees of an area about the antenna.

In exemplary embodiments, when the gateway allocates a satellite path for a terminal (for uplink and downlink), the gateway uses the segment blockage information previously gathered (for example, at a terminal training time or by a technician's onsite review), to determine which logical cell (and hence satellite) should be allocated. The use of logical cells dovetails with routing of data from one point to another, removing any knowledge of the terminal blockage from the packet-by-packet routing decision.

As illustrated in FIG. 3, a route or path may be set up by the gateway to avoid a satellite that would be blocked by the blockage from the building; however, the nodes (for example, the satellites, a bandwidth allocator or the like at the gateway, or the terminal) doing the routing have no knowledge of this reasoning—they just route the data according to the plan.

Figure 5:
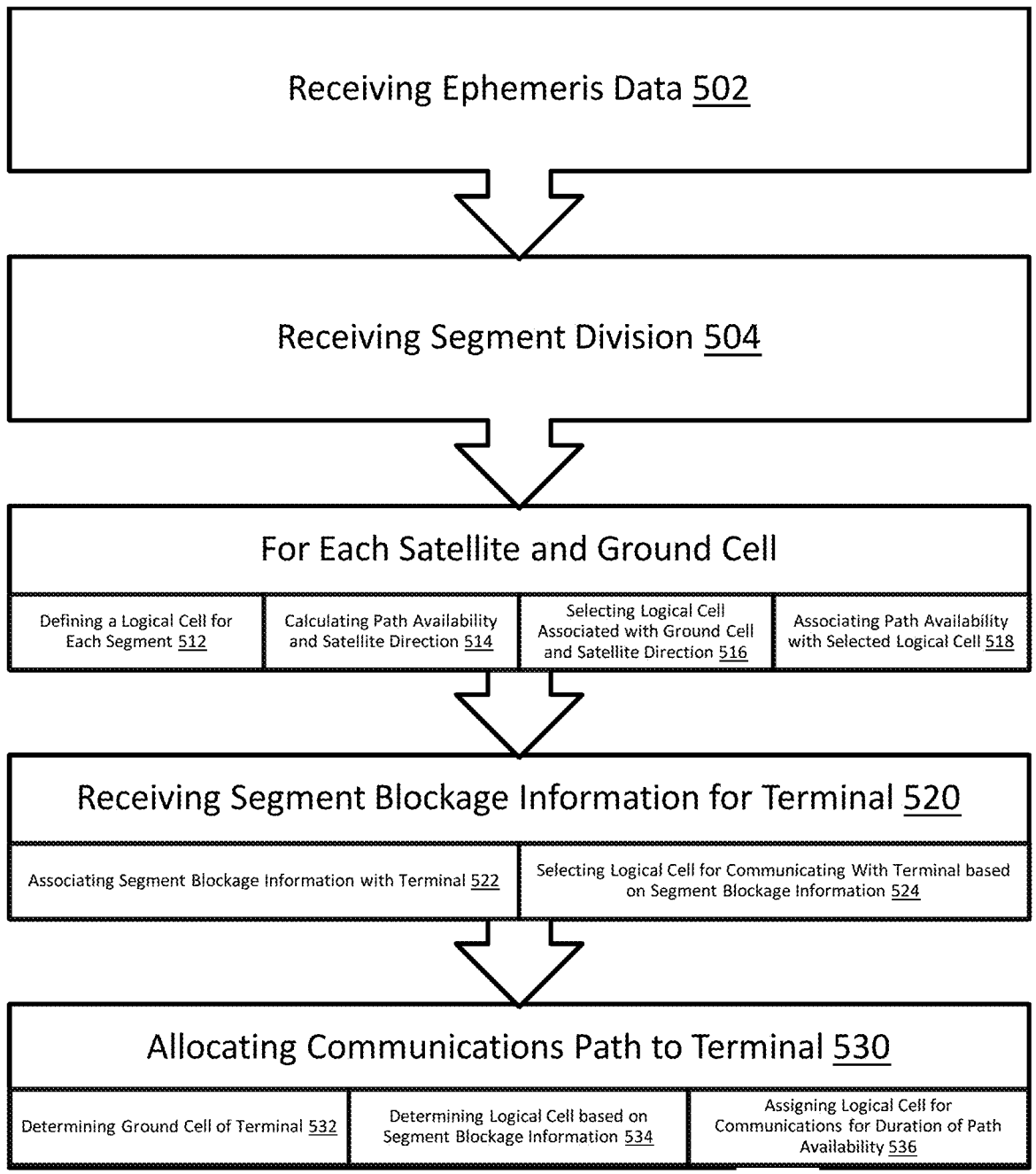
FIG. 5 illustrates a flowchart of an exemplary method for providing communications with a LEO satellite constellation using a non-omnidirectional antenna, according to some embodiments.

FIG. 5 illustrates a flowchart of an exemplary method for providing communications with a LEO satellite constellation using a non-omnidirectional antenna, according to some embodiments.

A method 500 for providing communications with a LEO satellite constellation using a non-omnidirectional antenna is disclosed. The method 500 may include an operation for receiving ephemeris data 502, for example, from a datastore, or an ephemeris server. The method 500 may include an operation for receiving segment division 504, for example, from a datastore, or a configuration server.

The method 500 may include operations 512, 514, 516, 518 for each satellite and ground cell. The method 500 may include the operation 512 for defining a logical cell for each segment. The method 500 may include the operation 514 for calculating path availability and satellite direction or angle of communication. The method 500 may include the operation 516 for selecting logical cell associated with the ground cell and the satellite direction. The method 500 may include the operation 518 for associating path availability with selected logical cell. The path availability may include, for example, satellite tracking information for an antenna, an angle of communication, a list of nodes to be traversed in order to connect endpoints, such as, a gateway and a terminal. The nodes may include satellites or other RF signal relays.

The method 500 may include an operation for receiving segment blockage information for a terminal 520, for example, by retrieving segment blockage information from a datastore. The method 500 may include an operation for associating segment blockage information with the terminal 522. The method 500 may include an operation for selecting a logical cell for communicating with the terminal based on segment blockage information 524 associated with the logical cell. The method 500 may include an operation for allocating a communications path to the terminal 530. The method 500 may include an operation for determining ground cell of terminal 532. The method 500 may include an operation for determining or selecting a logical cell based on the terminal's segment blockage information 534. The method 500 may include an operation for assigning the selected logical cell for communications for a duration of the path availability 536.

Figure 6:
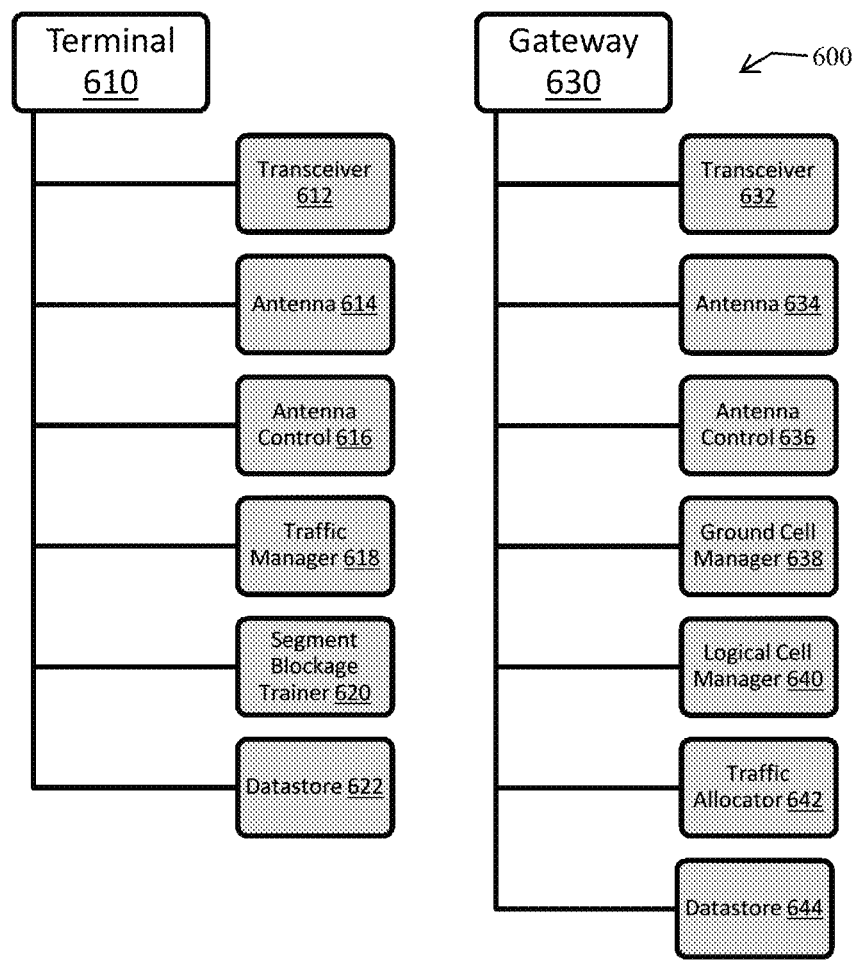
FIG. 6 illustrates an exemplary LEO communication system, according to various embodiments.

FIG. 6 illustrates an exemplary LEO communication system, according to various embodiments.

An exemplary LEO communication system 600 may include a terminal 610 and a gateway 630. The terminal 610 may include a transceiver 612, an antenna 614, an antenna control 616, a traffic manager 618, a segment blockage trainer 620 and a datastore 622. The segment blockage trainer 620 may use the transceiver 612, the antenna 614, the antenna control 616 and the datastore 622 to perform the operations listed in FIG. 4.

The gateway 630 may include a transceiver 632, an antenna 634, an antenna control 636, a ground cell manager 638, a logical cell manager 640, a traffic allocator 642 and a datastore 644. The logical cell manager 640 may use the transceiver 632, the antenna 634, the antenna control 636, the ground cell manager 638 and a datastore 644 to implement operations 512, 514, 516, 518, 520, 522, 524 as described in FIG. 5. The traffic allocator 642 may use the transceiver 632, the antenna 634, the antenna control 636, the logical cell manager 638 and a datastore 644 to implement operations 530, 532, 534, 536 as described in FIG. 5.

Although the subject matter has been described in language specific to structural features and/or methodological acts, it is to be understood that the subject matter in the appended claims is not necessarily limited to the specific features or acts described above. Rather, the specific features and acts described above are disclosed as example forms for implementing the claims. Other configurations of the described embodiments are part of the scope of this disclosure. Further, implementations consistent with the subject matter of this disclosure may have more or fewer acts than as described, or may implement acts in a different order than as shown. Accordingly, the appended claims and their legal equivalents should only define the invention, rather than any specific examples given.

I claim as my invention:

1. A method for determining blockages around a non-omnidirectional antenna for use with a Low Earth Orbit (LEO) constellation, the method comprising:
   providing System Information (SI) comprising ephemeris data for satellites in the LEO constellation, and a segment division that divides a ground about the antenna into segments; and
   determining a segment blocking information for the antenna by, for each of the satellites,
      calculating a current direction from the antenna to the respective satellite based on the respective satellite's ephemeris data,
      mapping the current direction into one of the segments,
      aiming the antenna in the current direction,
      attempting a signal lock with the satellite, and
      setting the segment blocking information indicating the mapped segment as blocked, when the signal lock is unsuccessful.

2. The method of claim 1, wherein the providing the SI comprises scanning the sky with the non-omnidirectional antenna to detect a Radio Frequency (RF) signal from one of the satellites, locating the RF signal and receiving the ephemeris data from the RF signal.

3. The method of claim 1, further comprising receiving a new ephemeris data to overwrite the ephemeris data; and repeating the determining.

4. The method of claim 1, further comprising transmitting the segment blocking information to a gateway.

5. The method of claim 1, wherein the non-omnidirectional antenna comprises a unidirectional antenna capable of being aimed in a desired direction by an antenna controller.

6. The method of claim 1, wherein a count of segments in the segment division comprises at least 4 segments, at least 8 segments, at least 16 segments, at least 32 segments, at least 64 segments, or at least 128 segments.

7. The method of claim 1, wherein each segment covers a wedge-shaped area and has a general direction.

* * * * *